(12) United States Patent  
Priepke

(10) Patent No.: US 7,419,345 B2
(45) Date of Patent: Sep. 2, 2008

(54) BIG BALE LOADER, HAULER AND STACKER

(75) Inventor: Edward H. Priepke, Lancaster, PA (US)

(73) Assignee: CNH America LLC, New Holland, PA (US)

( * ) Notice: Subject to any disclaimer, the term of this patent is extended or adjusted under 35 U.S.C. 154(b) by 297 days.

(21) Appl. No.: 11/106,281

(22) Filed: Apr. 14, 2005

(65) Prior Publication Data

US 2006/0245880 A1 Nov. 2, 2006

(51) Int. Cl.
A01D 90/00 (2006.01)
(52) U.S. Cl. ..................... 414/24.5; 414/679
(58) Field of Classification Search ................ 414/24.5, 414/25, 501, 788.4–788.6, 789.2, 789.3, 414/789.7, 791, 792.7, 792.9, 771, 776, 782, 414/783, 679
See application file for complete search history.

(56) References Cited

U.S. PATENT DOCUMENTS

| 2,132,231 | A | * | 10/1938 | Dunser ........................ 209/706 |
| 3,595,416 | A | | 7/1971 | Perrotti ........................ 214/767 |
| 4,030,626 | A | | 6/1977 | Durham ........................ 214/767 |
| 4,076,138 | A | | 2/1978 | Honomichl, Sr. ........... 214/518 |
| 4,282,969 | A | | 8/1981 | Zipser ........................ 198/747 |
| 4,329,102 | A | | 5/1982 | Gray ........................... 414/24.5 |
| 4,370,796 | A | | 2/1983 | Wilson ....................... 29/564.3 |
| 4,459,075 | A | | 7/1984 | Eichenberger ............. 414/24.5 |
| 4,604,018 | A | | 8/1986 | Kruse ........................... 414/44 |
| 4,789,289 | A | | 12/1988 | Wilson ....................... 414/24.6 |
| 5,209,536 | A | | 5/1993 | Rogers ........................ 294/88 |
| 5,405,229 | A | * | 4/1995 | Tilley et al. ................. 414/111 |
| 5,697,758 | A | * | 12/1997 | Tilley ......................... 414/802 |
| 5,758,481 | A | * | 6/1998 | Fry .............................. 56/474 |
| 5,813,814 | A | * | 9/1998 | Smart ......................... 414/111 |
| 5,829,233 | A | | 11/1998 | Stirling ....................... 53/567 |
| 5,882,163 | A | * | 3/1999 | Tilley ......................... 414/111 |
| 6,247,885 | B1 | * | 6/2001 | Smart ......................... 414/111 |
| 6,267,547 | B1 | | 7/2001 | Lund .......................... 414/697 |
| 6,312,205 | B1 | | 11/2001 | Vandenberg ............... 414/24.5 |
| 2006/0188363 | A1 | * | 8/2006 | Priepke ....................... 414/501 |
| 2007/0041811 | A1 | * | 2/2007 | Priepke ....................... 414/24.5 |

* cited by examiner

Primary Examiner—Saul J. Rodriguez
Assistant Examiner—Joshua I Rudawitz
(74) Attorney, Agent, or Firm—Patrick M. Sheldrake; John William Stader; Michael C. Harms

(57) ABSTRACT

A large bale loading, hauling and stacking apparatus that mounts on a production truck chassis. Loading is accomplished with a centrally located bale clamping mechanism that picks up a bale, rotates it approximately 180 degrees and deposits it on a manipulator that can selectively reorient the bale for selective placement on a load rack. A stack of bales is thus formed on the load rack and later deposited in the field.

20 Claims, 17 Drawing Sheets

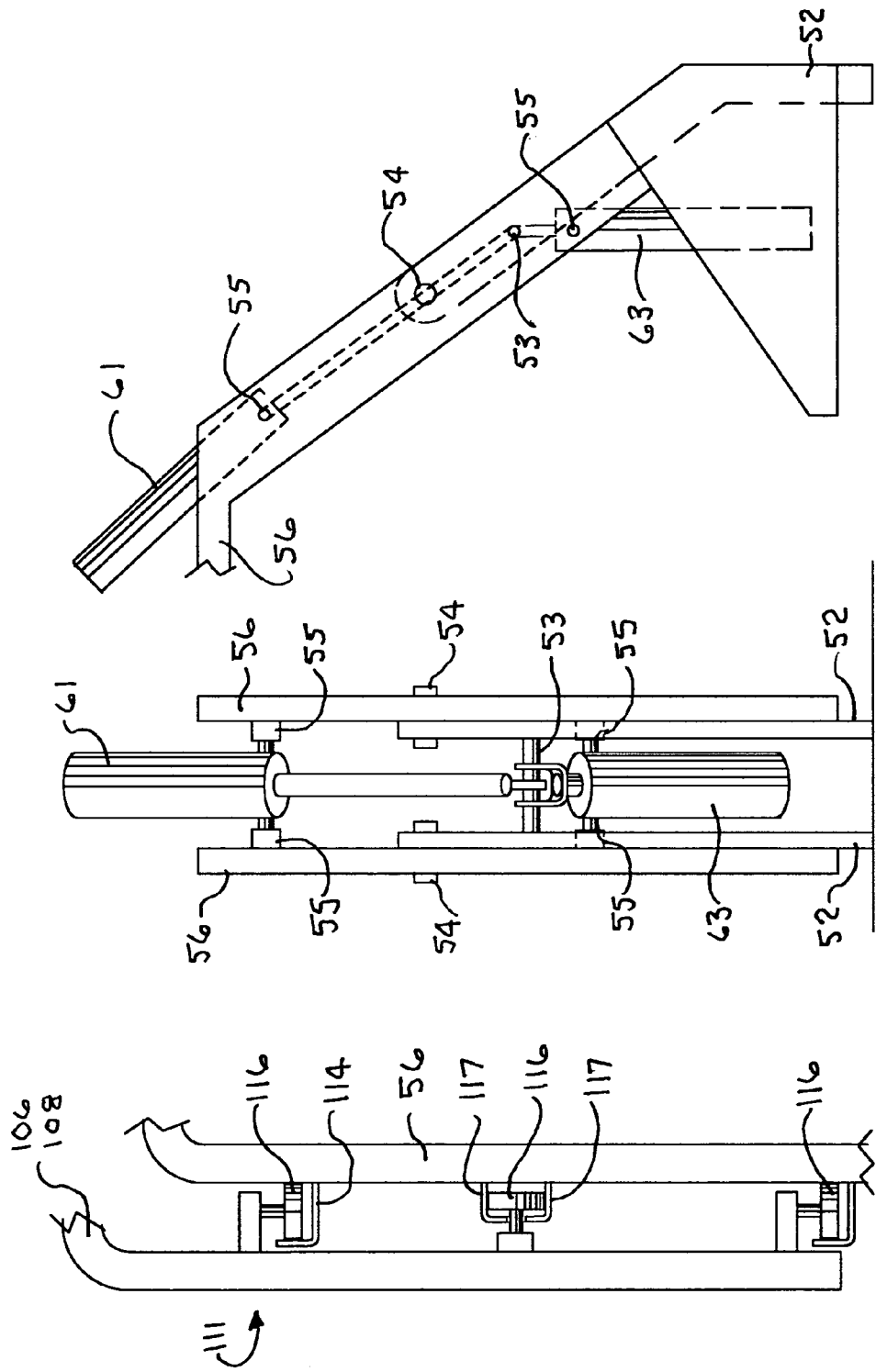

BIG BALE LOADER, HAULER AND STACKER

CROSS-REFERENCE TO RELATED APPLICATIONS

This application is related to U.S. Application No. 11/106,310, entitled "Material Clamping Mechanism" in the name of the same inventor and filed on the same date as the instant application.

BACKGROUND OF THE INVENTION

The present invention relates generally to agricultural self-propelled bale handling machines, and more particularly to such a machine that loads, hauls and stacks big bales.

A large proportion of the resources and time of the agricultural industry is directed toward the production of feed for animals, and most specifically to the production of baled stem and leaf crops such as hay. The conventional process is to cut and condition the crop with a windrower, deposit it on the ground to dry, bale the crop when appropriately dry, and then position the bales in stacks for storage or transportation. High labor requirements and increasing costs of hand hauling have caused a growing number of commercial growers to abandon their small square bale operation for a large bale package, such as round bales, or large rectangular bales 3'×3', 3'×4', or 4'×4' in cross-section. Commercial haulers prefer large square bales over small square bales because they can drive into a field and be loaded for a cross-country trip in less than an hour. Large rectangular bales are loaded onto flat-bed trucks or semi-trailers directly in the field at about 20 tons per man-hour. It is these large bales that have become increasingly popular over the last several years, and to which this invention is most concerned.

While a pull-type machine could be designed and built to accomplish the desired tasks of loading, hauling and stacking large rectangular bales, it is most practical to develop a self-propelled unit, using a generally available truck cab and chassis as the source of motive and hydraulic power. Some mechanical devices for loading, hauling and stacking these large rectangular bales have been developed, however, they are unable to stack high enough, do not have the capability to lay various tie tiers, may greatly overload the front axle of the unit, and may not have adequate traction on rolling or wet terrain while loading.

Therefore, there is a need in the art for a convenient and automated system for loading a significant number of large bales onto a vehicle, with the option of tie tiers, hauling them relatively long distances, and stacking the bales in a stable manner.

SUMMARY OF THE INVENTION

Accordingly, it is an object of the present invention to provide a bale wagon that automatically loads, hauls and stacks large rectangular and round bales.

Another object of the present invention is to provide an automatic bale wagon for large bales that does not overload the front axle of the unit.

It is another object of the present invention to provide a large bale loader, hauler and stacker that uses a truck chassis as the main support and source of motive power.

Yet another object of the present invention is to provide a large bale loader, hauler and stacker based on an over-the-road truck chassis that loads the bales, optionally with tie tiers, using a unique bale grasping mechanism.

It is yet another object of the present invention to provide a large rectangular bale wagon that uses a bale loader that engages the bale, centerline of the chassis to centerline of the bale.

It is yet another object of the present invention to provide a large bale handling machine that has a narrow front frame and loader arms for good forward visibility for the operator.

It is yet another object of the present invention to provide a large automatic bale wagon that clamps the bales for loading and manipulation rather than spearing or grasping them with hooks.

It is another object of the present invention to provide a large bale handling machine that clamps the bales on the side rather than on the twine covered surfaces.

It is another object of the present invention to provide a large bale handling machine that manipulates the bales while sitting on a table, not hanging on a spear or on grasping hooks.

It is another object of the present invention to provide a large bale handling machine that can selectively form tie tiers.

Another object of the present invention is to provide a large bale loading, hauling and stacking apparatus that can stack 3'×4' bales six high with the twine down.

Another object of the present invention is to provide an automatic bale wagon that can make an ideal six high twine down stack with the second and fifth tiers cross tied, convenient to common clamp loading trucks.

Yet another object of the present invention is to provide an automatic bale wagon that can handle shorter bales like five or six feet long silage bales.

Yet another object of the present invention is to provide an automatic bale wagon that can handle 4' long bales, positioning them side by side for an 8' wide load.

Yet another object of the present invention is to provide an automatic bale wagon that can handle 4'×4' bales with loader pivot repositioning (repositioning is done either manually or hydraulically).

Another object of the present invention is to provide an automatic bale wagon that can handle round bales as well as large rectangular bales with the same loader and manipulator.

Another object of the present invention is to provide a large bale loader, hauler and stacker that is automated by the use of an integrated controller/sensor arrangement that allows the operator to select and manage the bale stack structure.

Another object of the present invention is to provide a bale loader, hauler and stacker that is adjustable to handle the popular sized big rectangular bales, 3'×3', 3'×4', and 4'×4' as well as round bales.

These and other objects are attained by providing a large bale loading, hauling and stacking apparatus that mounts on a production truck chassis. Loading is accomplished with a centrally located bale clamping mechanism that picks up a bale, rotates it approximately 180 degrees and deposits it on a manipulator that can selectively reorient the bale for selective placement on a load rack. A stack of bales is thus formed on the load rack and later deposited in the field.

DESCRIPTION OF THE DRAWINGS

The advantages of this invention will be apparent upon consideration of the following detailed disclosure of the invention, especially when taken in conjunction with the accompanying drawings wherein:

FIG. 3b is a partial side plan view of the carrier mast, horizontal tracks and carrier rollers;

FIG. 3c is a partial front view of the loader boom cylinders and boom frame;

FIG. 3d is a partial side view of the loader frame, cylinders and pivot;

DESCRIPTION OF THE PREFERRED EMBODIMENT

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right" are used as a matter of mere convenience, and are determined by standing at the rear of the machine facing in its normal direction of travel. Furthermore, the various components shown or described herein for any specific application of this invention can be varied or altered as anticipated by this invention and the practice of a specific application of any element may already by widely known or used in the art by persons skilled in the art and each will likewise not therefore be discussed in significant detail.

Broadly, the machine comprises a truck chassis fitted with two modules and a load rack. The first module is a loader that clamps and loads the bales endwise over the front center of the truck cab. Manipulation for positioning the bales into tiers is done by the second module, or manipulator, while the bale is sitting on a table. The manipulator then deposits the bales onto the load rack where the stack is formed.

Figure 1:
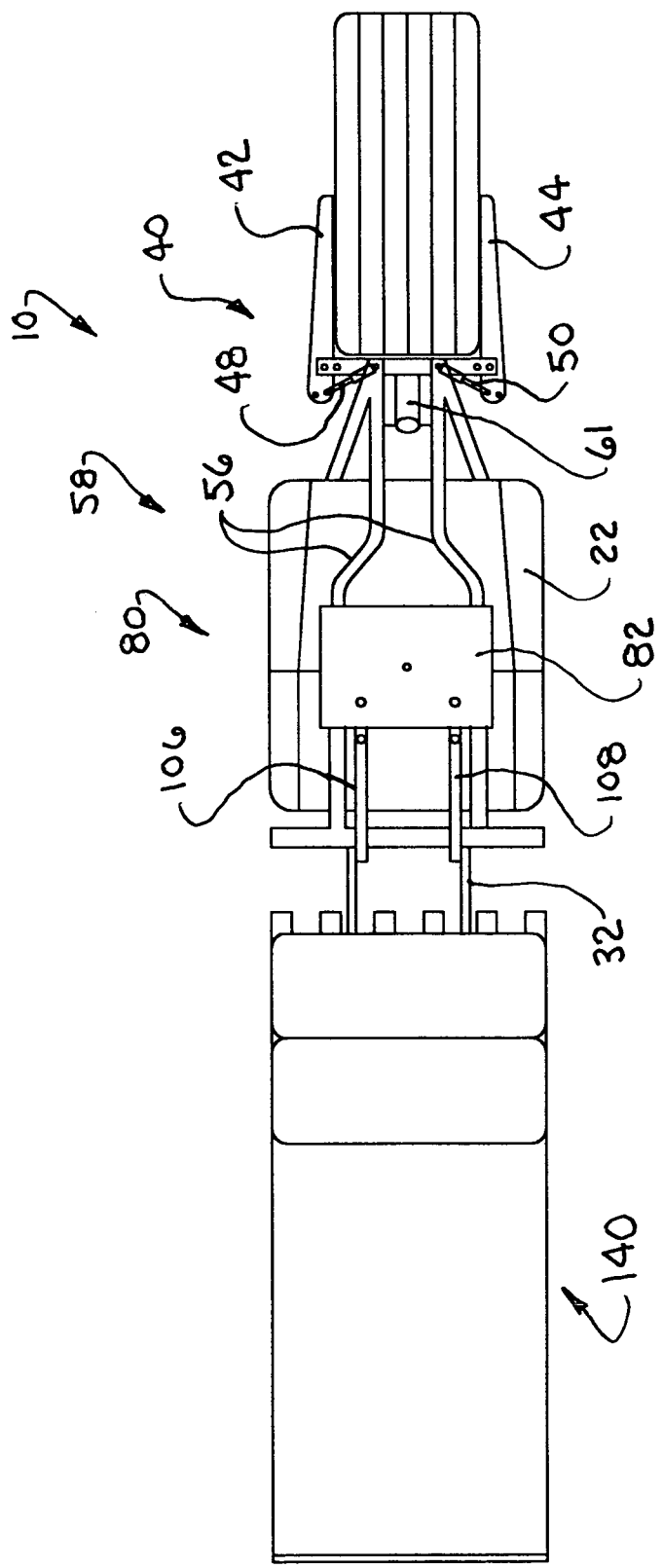
FIG. 1 is a top plan view of the bale loading, hauling and stacking vehicle of the present invention.
Figure 2:
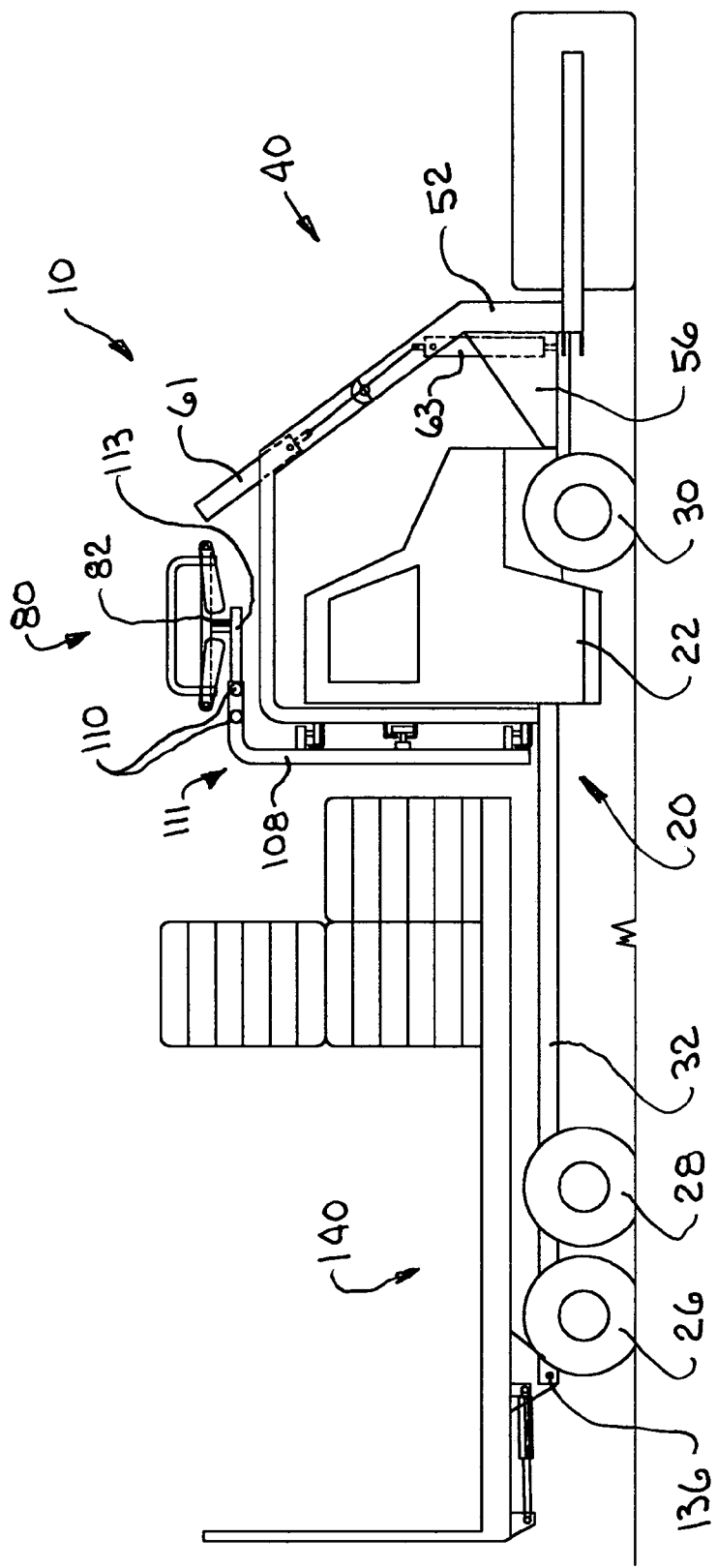
FIG. 2 is a side plan view of the vehicle of FIG. 1 showing a bale in the pickup position.

FIGS. 1 and 2 provide a more specific depiction of the loader, hauler and stacker vehicle 10 of the instant invention. A truck chassis 20 with a cab 22 thereon provide the support and ruotwe power for vehicle 10. Chassis 20 includes several components well known in the art, pairs 26, 28 and 30 affixed to and supporting a main frame 32 and the various elements making up a self-propelled vehicle combined with an aericuitural material-handling apparatus. The wheel pairs are supported on axles and other well known drive components (not shown). In this particular embodiment, the rear wheel pairs 26, 28 are duals, i.e., two wheels on each end of the axle, for heavy load support and distribution. A bale loader 40, to be described in further detail below, is mounted to the forward portion of chassis 20, in front of and over the hood and windshield of cab 22. A load rack 140. also to be described further below, is pivotably attached to chassis 20 at pivot axis 136.

The embodiment to be described immediately below employs an over-the-road truck chassis-based machine that loads, hauls and stacks large rectangular bales or, in other embodiments, round bales. The loading and stack building is accomplished with two modules, a bale loader 40 and a bale manipulator 80. In this embodiment the machine forms a stack of twelve 3'×4'×8' bales six tiers high with the twine down. This is accomplished without overloading the front axles, and providing good traction throughout the stack-building cycle. To reduce the overall length required, the manipulator has the ability to rotate the bales into the load's fore-and-aft orientation before the bale is moved to the load rack.

The bales are loaded, manipulated and positioned while clamped on the sides (surfaces without twine), thus minimizing bale damage and leaf losses when compared to handling with spearing and grasping hooks. The bales are loaded endways over the front of the truck (FIG. 1). Bale loader 40 clamps the sides of the bales with opposing clamp arms 42, 44 that are each pivotably affixed to loader boom arm 46 and selectively movable relative thereto through the action of clamping cylinders 48, 50. Boom arm 46 is rigidly affixed to loader boom 52, and boom 52 is pivotably affixed at 54 to handler main frame 56—which extends up and over cab 22, and down the back side thereof where it is affixed to truck frame 32.

Figure 3A:
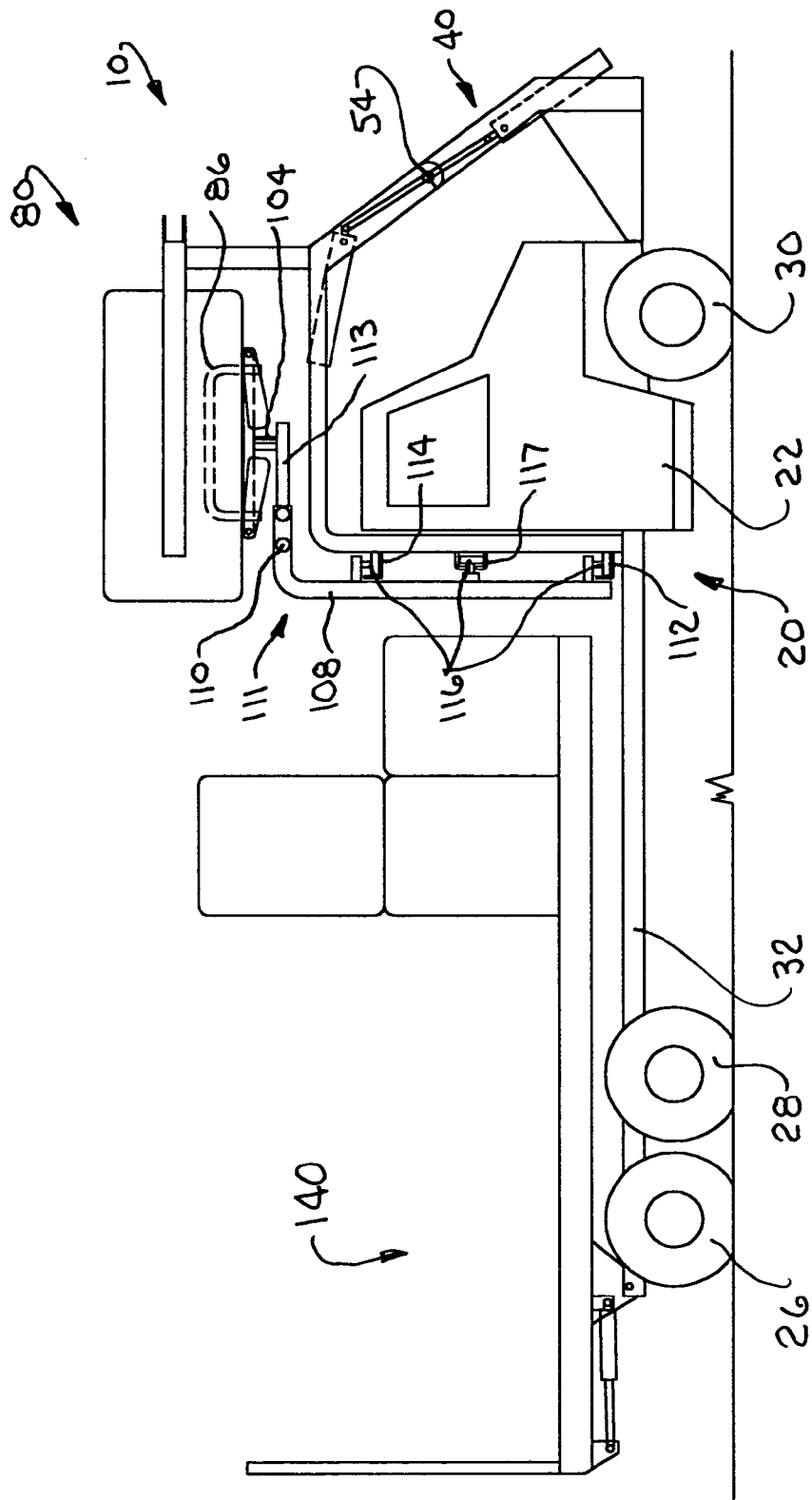
FIG. 3a is a side plan view, similar to that of FIG. 2, showing a bale on the manipulation mechanism above the cab.

As can be seen, handler main frame 56 is comprised of two primary frame members (FIGS. 1, 3c and others). The boom 52 is pivotally connected at the generally horizontal axis extending through pivot points 54-54. The loader pivots the bale upwardly and rearwardly from the ground, through 180 degrees to the manipulator table, with the bale lengthwise. The boom 52 is pivoted through the selective action of upper and lower respective hydraulic cylinders 61, 63 connected at pin 53. These cylinders are mounted on trunions 55-55 to allow them to pivot as required during the raising and lowering of the boom 52 relative to main frame 56.

Figure 4:
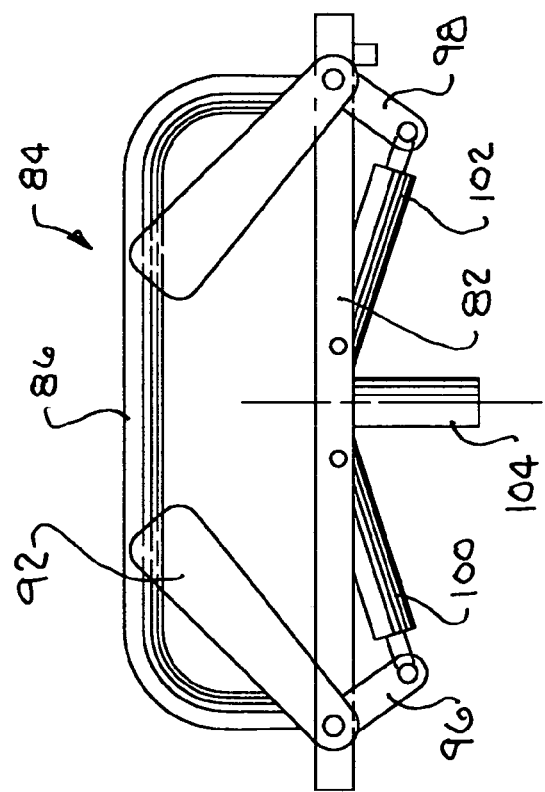
FIG. 4 is a partial side plan view of the bale manipulation mechanism, showing particularly the bale clamp.

Once the bale is positioned on the manipulator table 82 by the loader 40, manipulator clamp 84 (FIGS. 4 and 5) clamps the bale to maintain secure and precise positioning for manipulation. Then, the loader releases the bale and returns to its lowered position. Manipulator clamp 84 is comprised of two different clamping components, pivoting paddles on one side of the manipulator table and an elongate bar on the other. Bar clamp 86 pivots about point 88 via activation of hydraulic cylinder 90. On the opposite side of manipulator table 82 are a pair 92, 94 of generally flat paddles pivotably attached, respectively, to table 82 at pivot points 96, 98. Thus, the bale is clamped between paddles 92, 94 which pivot, through the operation of hydraulic cylinders 100 and 102, in a plane generally perpendicular to table 82 and the side of the bale resting on table 82, and bar clamp 86 that pivots into the opposing side of the bale. The pivoting paddles allow release of the clamped bale when positioned above or beside another bale; the paddles then being between the bales when the bale is positioned and then pivoted out from between the bales to release the positioned bale. Bar clamp 82 always pivots open into an unoccupied space.

Figure 6A:
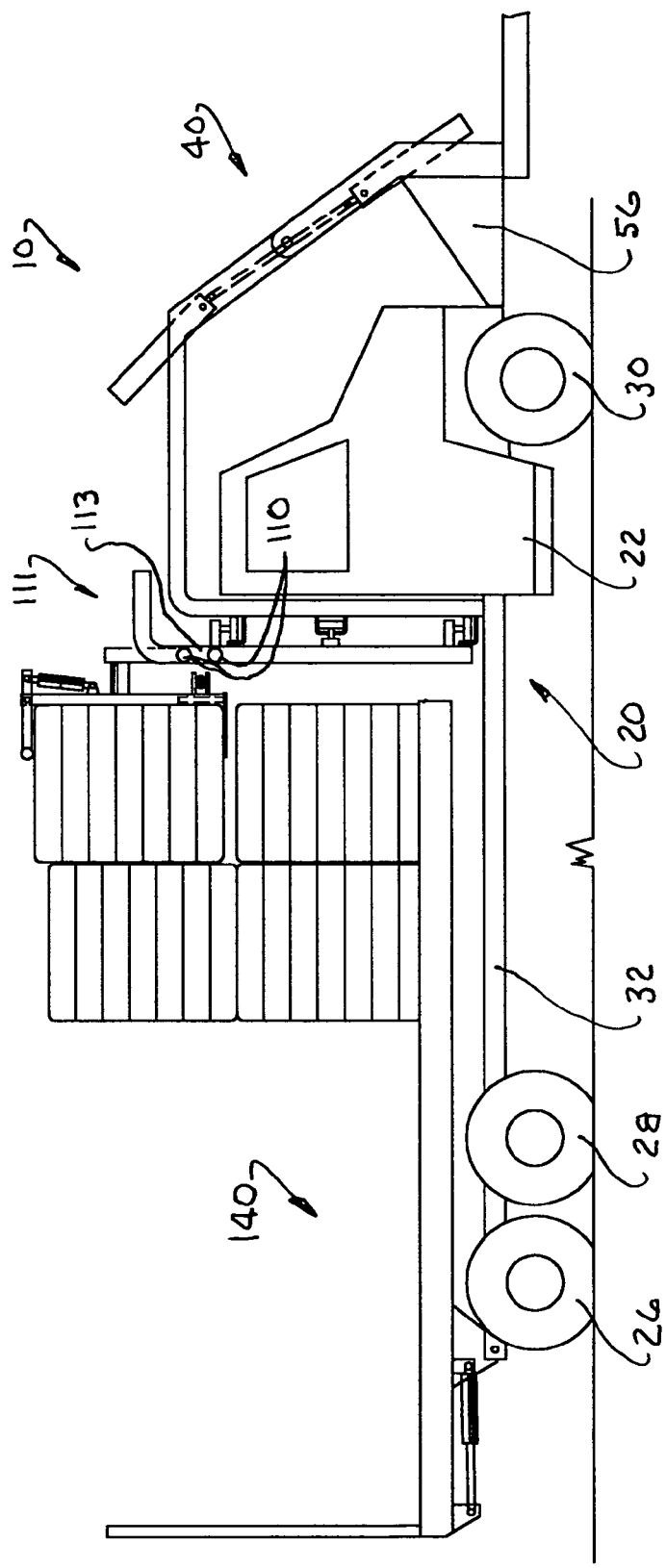
FIG. 6a is a side plan of a vehicle with the bale manipulation components mounted thereon, showing a rotated bale being moved back and down the mast to position the bale on the load.
Figure 6B:
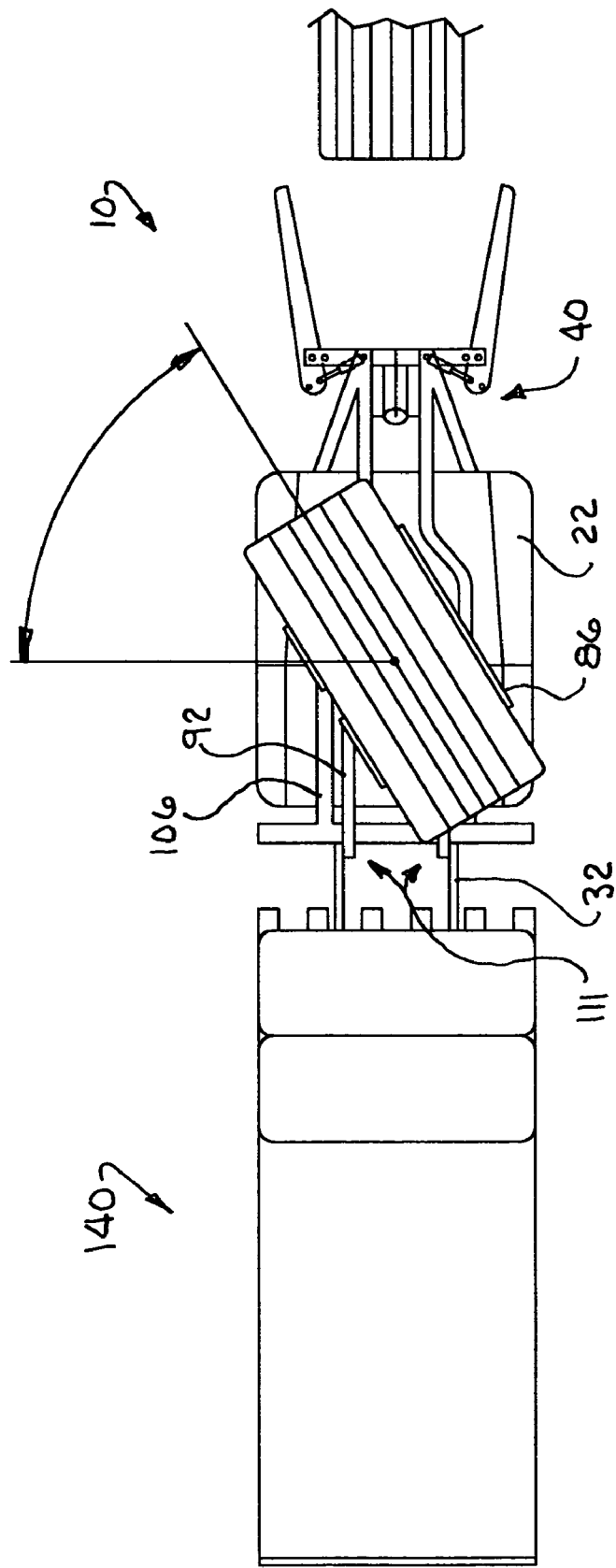
FIG. 6b is a top plan view of the vehicle of the present invention showing, inter alia, a bale on the bale manipulation mechanism partially rotated prior to deposit on the load rack.
Figure 7A:
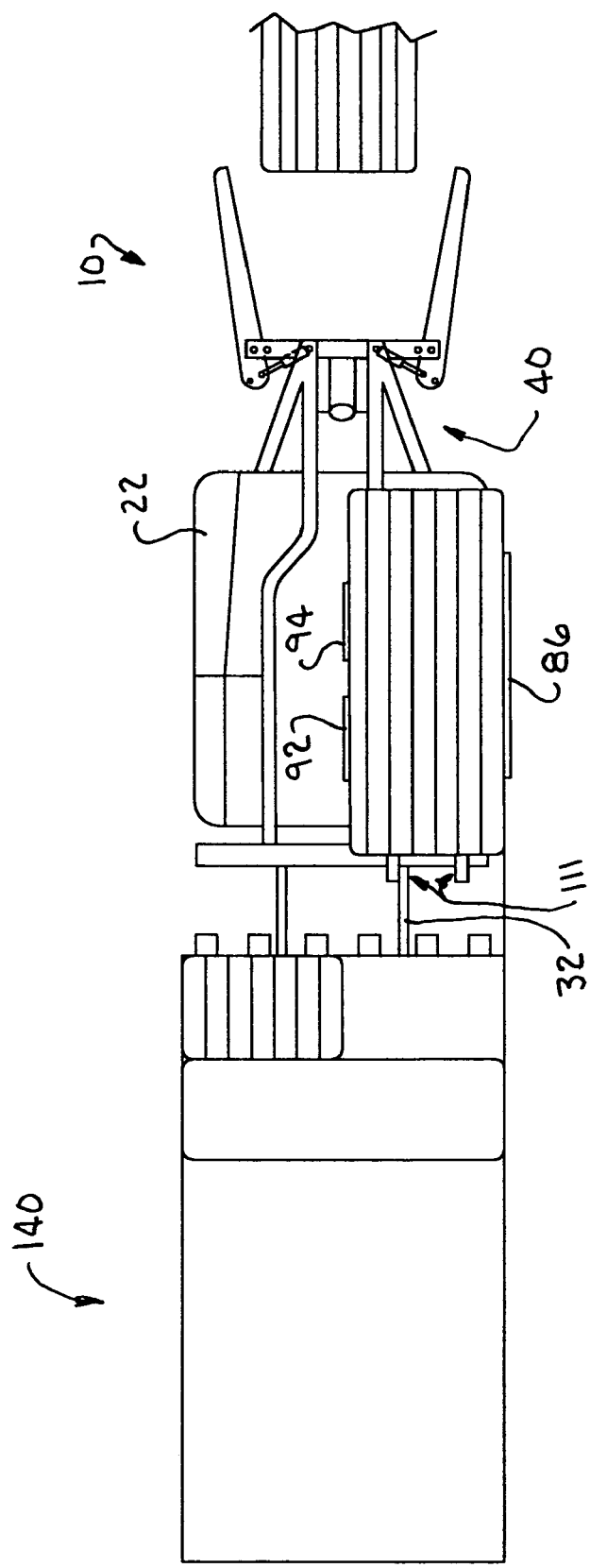
FIG. 7a is a top plan view of the vehicle, similar to FIG. 6a, with a bale rear plan view, similar to FIG. 6, with a bale pushed to the right prior to deposit on the load rack.
Figure 7B:
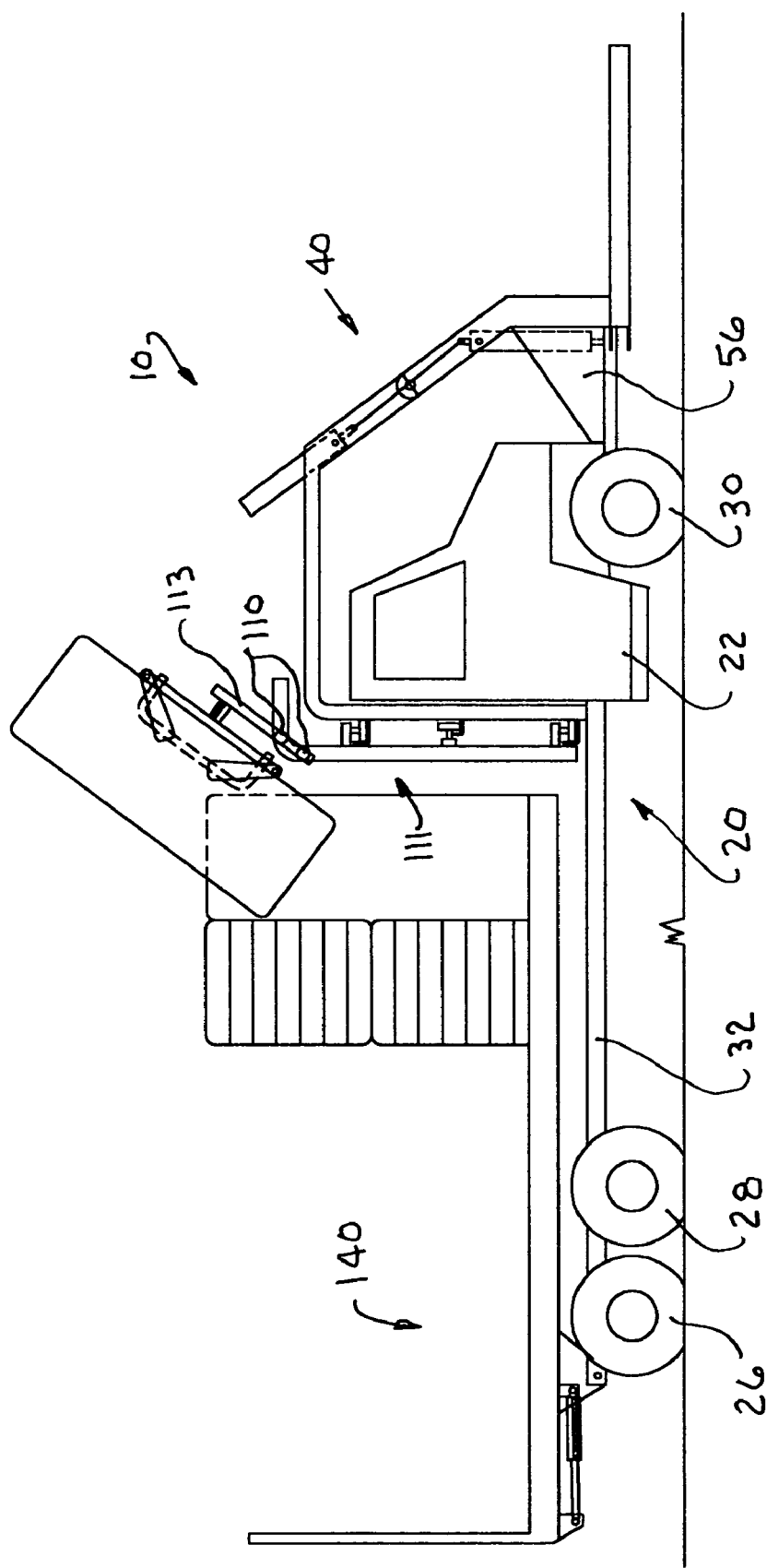
FIG. 7b is a side plan view of the vehicle of FIG. 7a, showing a tier bale moving back and down the mast for positioning on the load rack.
Figure 7C:
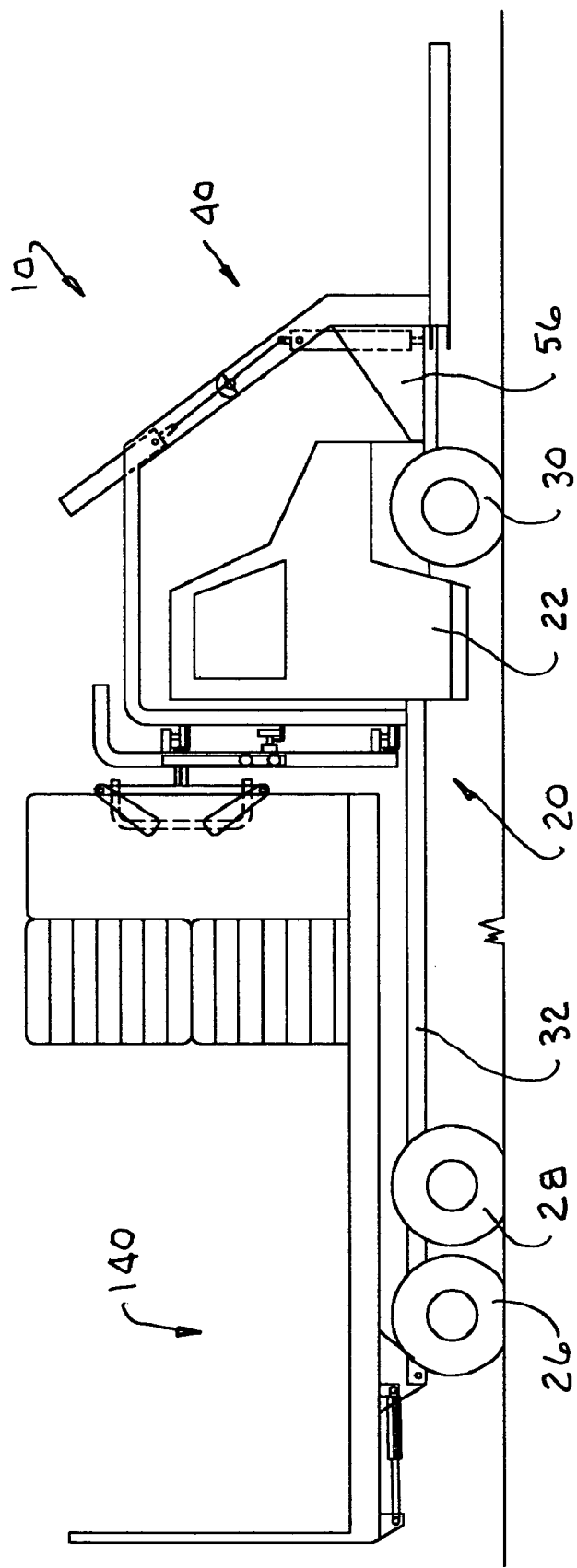
FIG. 7c is a side plan view of the vehicle of FIGS. 7a and 7b, showing the deposited bale in position on the load rack.
Figure 8:
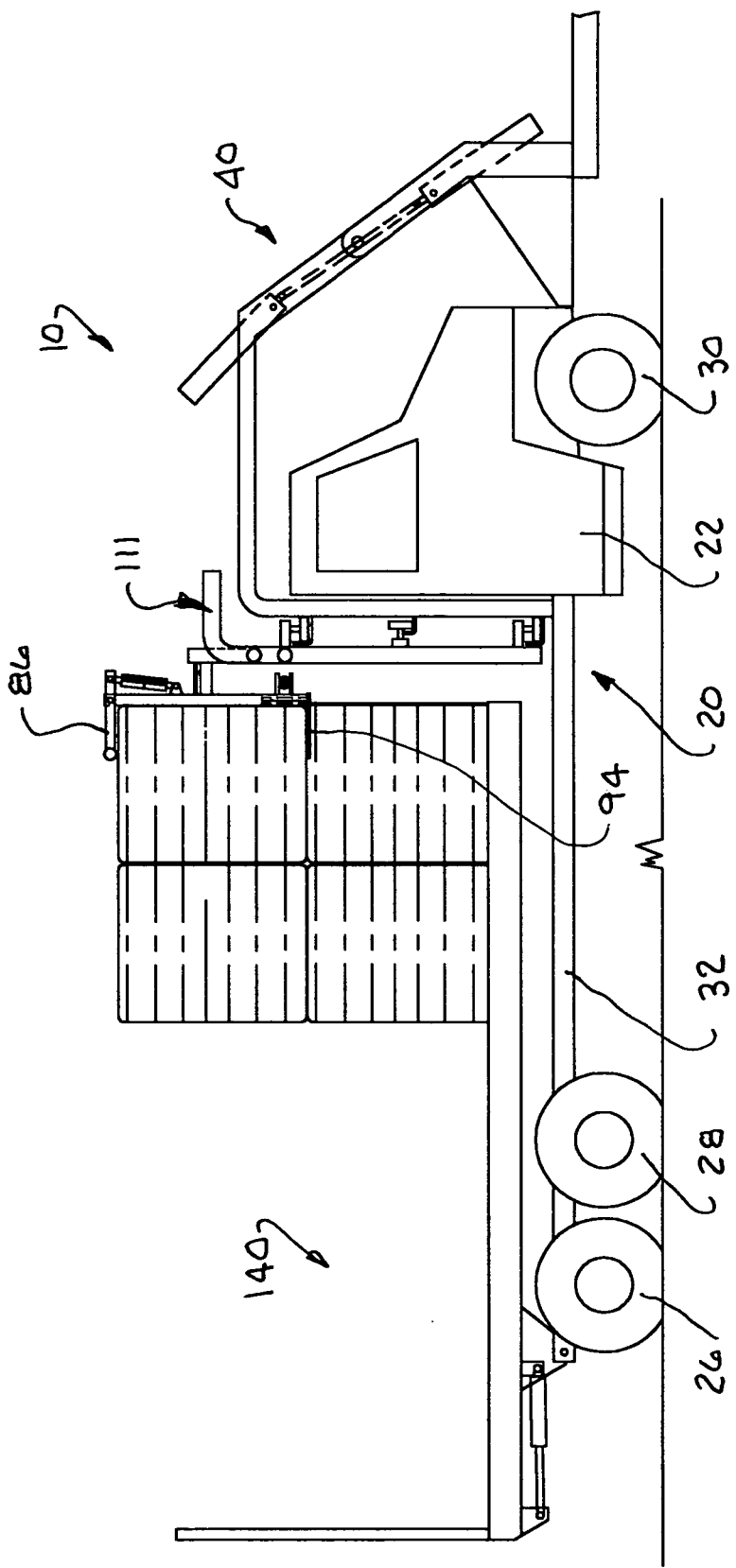
FIG. 8 is a side plan view of the vehicle, similar to FIGS. 6 and 7, showing the bale manipulation mechanism depositing a bale on previously deposited bales on the load rack.
Figure 9:
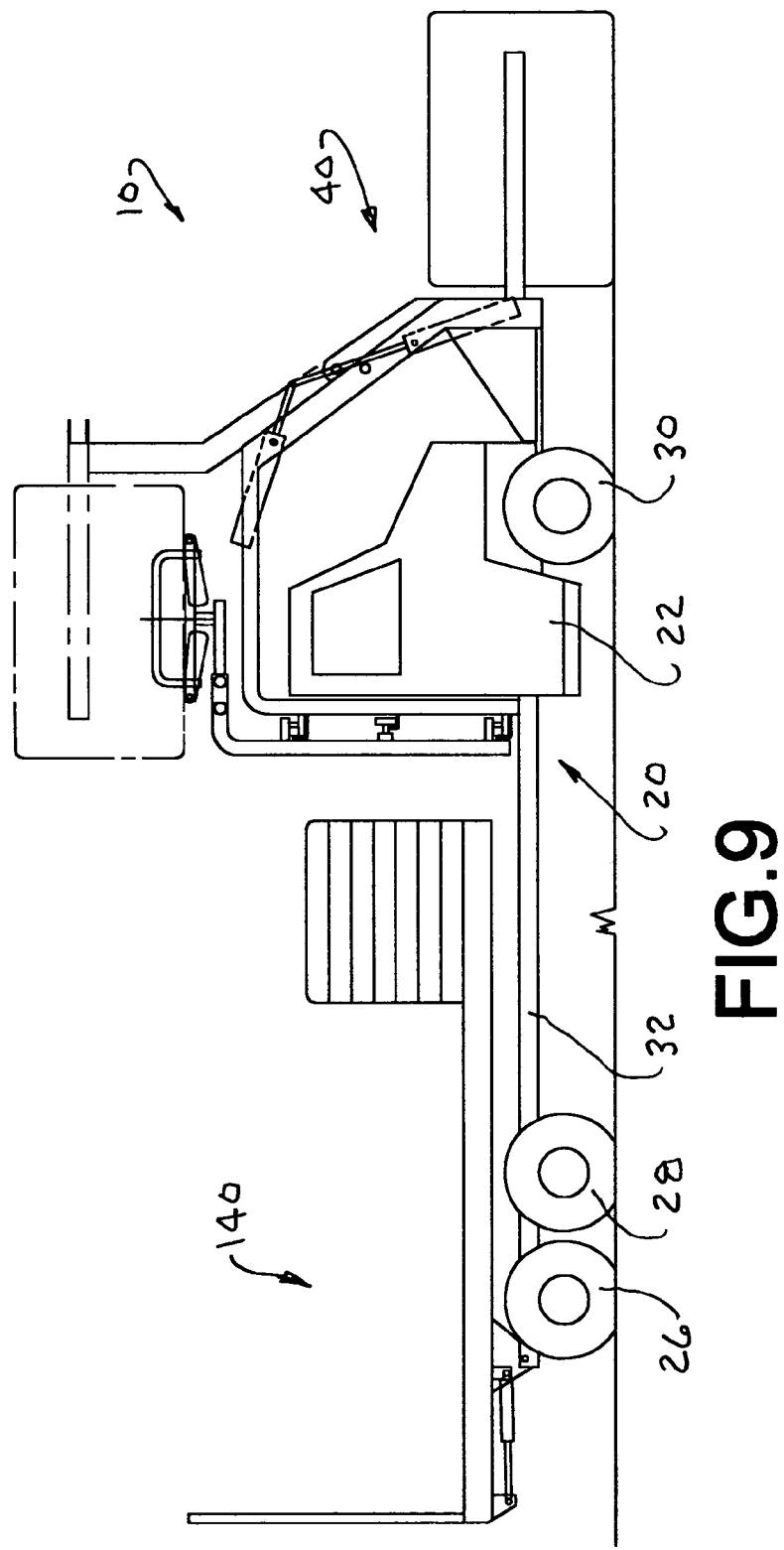
FIG. 9 is a side plan view of an alternative embodiment of the vehicle, showing alternative mounting locations in the frame for the boom pivot and cylinder trunion mounts to accommodate different length bales.

Manipulator table 82 is pivotably affixed to manipulator carrier 113 via stub shaft 104. A carrier mast 111 extends partially across the top of and down the back of cab 22 and is comprised of a pair of enclosed rails 106, 108 into which carrier rollers 110 (only the right side shown, but there are also rollers on the left side) fit for allowing the manipulator table with a clamped bale, to follow the tracks rearwardly and downwardly in a path specified by the rails. These enclosed rails, similar in purpose to those used in most garage doors, are used here for the stability and reliability they provide. When the manipulator table, with a clamped bale, is manipulated to its tier-building orientation, carrier 113 moves back and down the mast to the desired location for positioning the bale into the tier (FIGS. 6a, 7a and 7b). The carrier 113 preferably moves with a gear (not shown) on the carrier engaged with a rack on the mast 111. The gear is driven with an hydraulic motor through a worm gearbox (also not shown) for speed reduction and for holding position when stopped. In like manner, the mast with table is preferably positioned sideways by an hydraulically driven rack and pinion arrangement on horizontal tracks 112, 114 and 117 mounted to the frame 56. The side shift tracks are in the form of a pair 112, 114 and extend outwardly from the portion of the loader main frame 56, and, along with rollers 116 on carrier mast 111 control movements about a vertical axis and about a horizontal axis perpendicular to the direction of travel of the vehicle. Side shift track pair 117, with rollers 116 carry the weight of the mast and carrier, control the moment about an axis in the direction of travel, and allow the carrier mast to be moved via hydraulic power in a plane perpendicular to the line of travel of the vehicle, and provides the flexibility to deposit the bale at varying locations side to side on the load rack 140. Thus, after the bale is clamped on the manipulator table, the loader clamp releases and moves out of the way to allow manipulation of the bale. Manipulation of the bale is either 90 degrees counter-clockwise rotation (assuming the pivoting paddles 92, 94 are on the left) when viewed from above or sideways movement of the table right or left. Sideways movement is accomplished by moving the carrier mast 111 right or left (FIGS. 6, 7 and 8). It is foreseen that both manipulations could be used for building tiers of 4' long bales and round bales. Bale lengths may be anywhere from 4' to 8'. For 4'×4' bales, the loader boom pivot center and cylinder trunions need to be moved upward about seven inches. This could be accomplished by having alternative mounting locations in the frame or by having a movable sub-frame for the boom pivot and trunion mounts (see FIG. 9).

Figure 5:
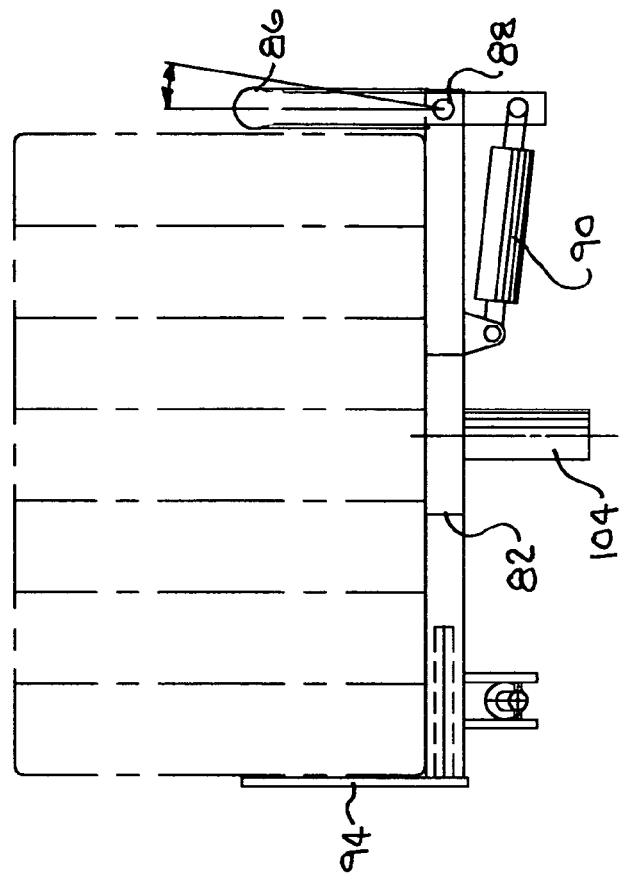
FIG. 5 is a partial front plan view of the bale manipulation mechanism of FIG. 4, showing a bale in phantom.
Figure 10:
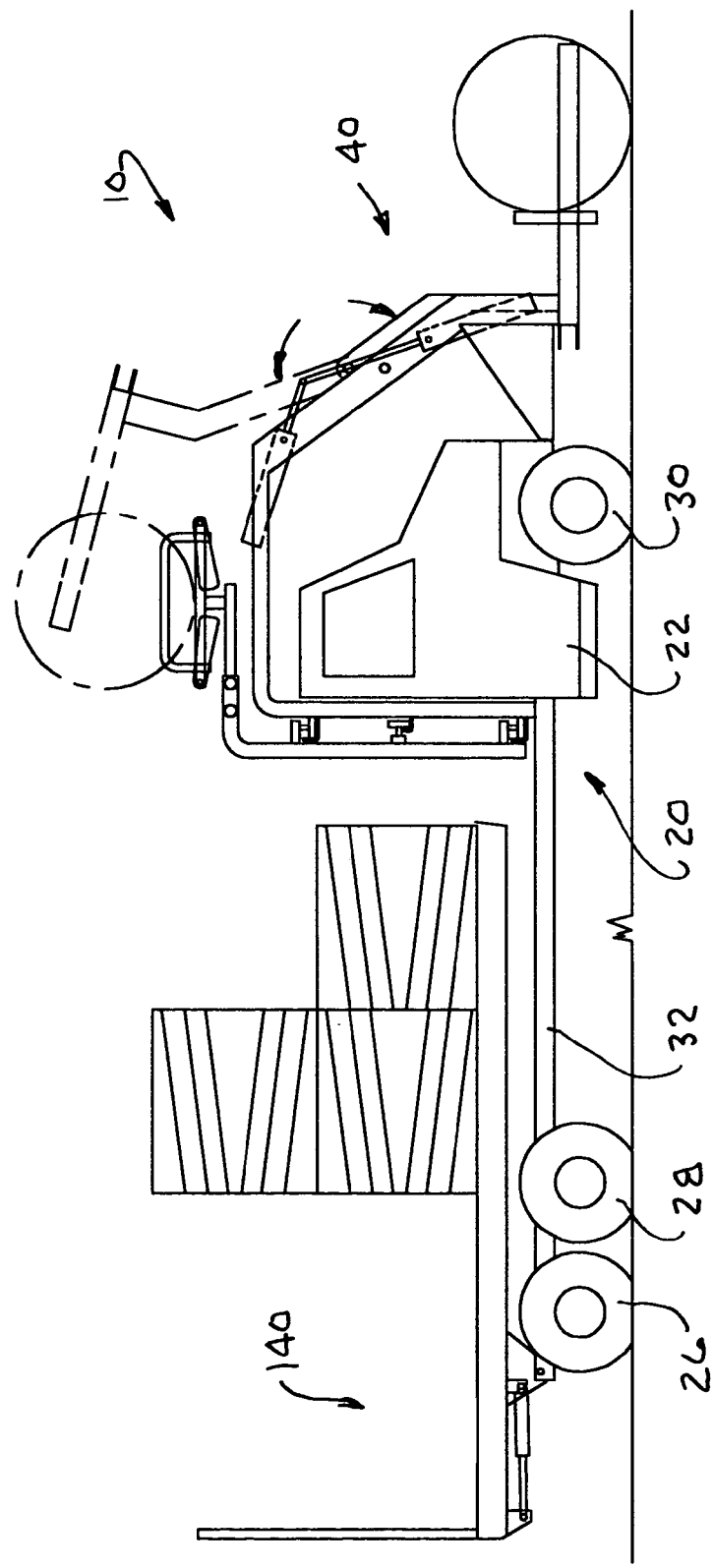
FIG. 10 is a side plan view of the vehicle, showing a stack of round bales being formed on the load rack, all bales on their sides.
Figure 11:
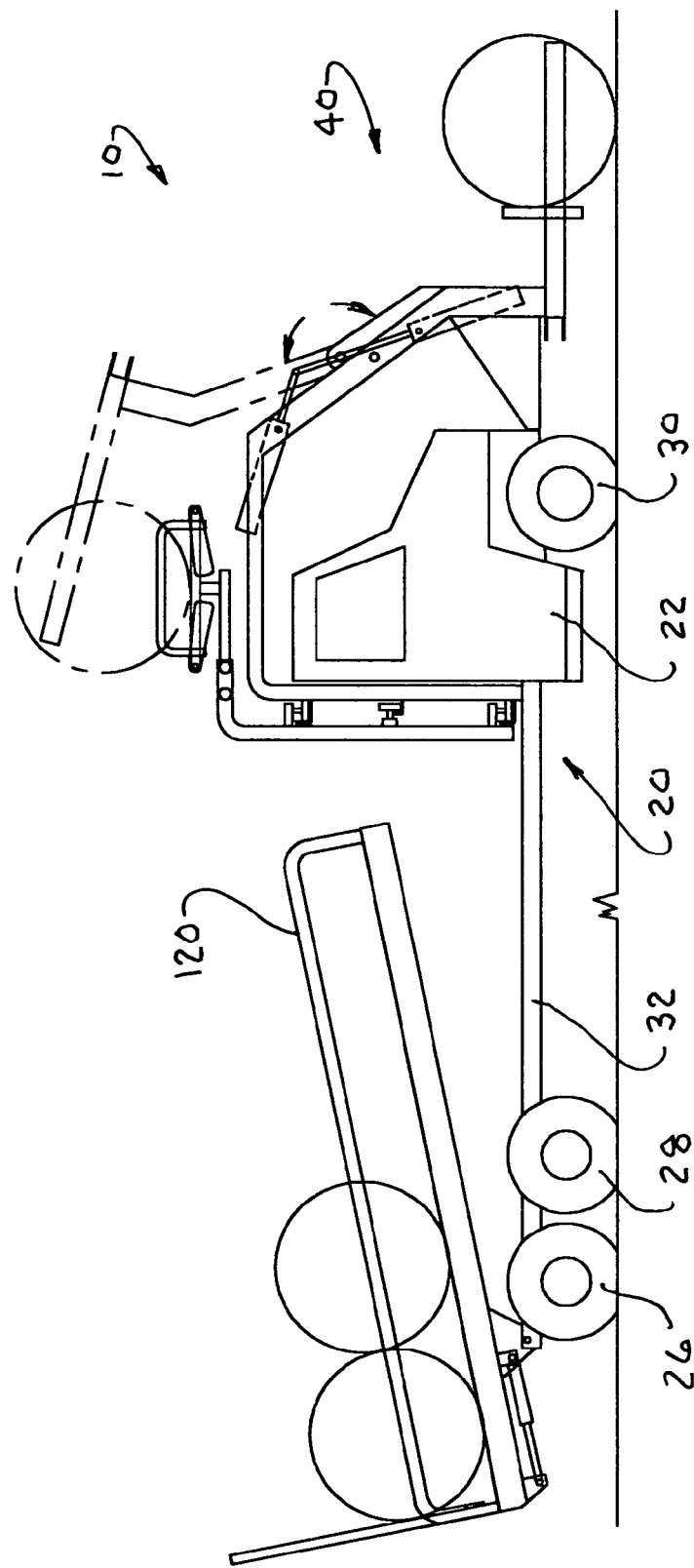
FIG. 11 is a side plan view of an alternative embodiment of the vehicle handling round bales.

Round bale diameters up to 5' can be stacked on their sides (see FIG. 10). With stanchions 120 (FIG. 11), bales of any diameter could be load. The manipulator table would need be adjustable, either hydraulically or manually, for 32" (referred to as "3-foot bales" or 48" wide bales (referred to as "4-foot bales"), each side would move in or out from center (FIG. 5). With round bales, 60" wide table adjustment could be considered as well as 48". Also, with round bales the loader would stop less than 180 degrees rotation (FIGS. 10 and 11), depending on the diameter to set the bale properly on the manipulator table.

The main frame assembly 58 and load rack assembly 140 can be two preassembled modules for quick installation onto a truck chassis. The truck would only have to be set up to supply hydraulic and electrical power for the bale handling system. The main frame assembly would include hydraulic reservoir, valves, and associated plumbing, and electronic controller and associated wiring.

Figure 12:
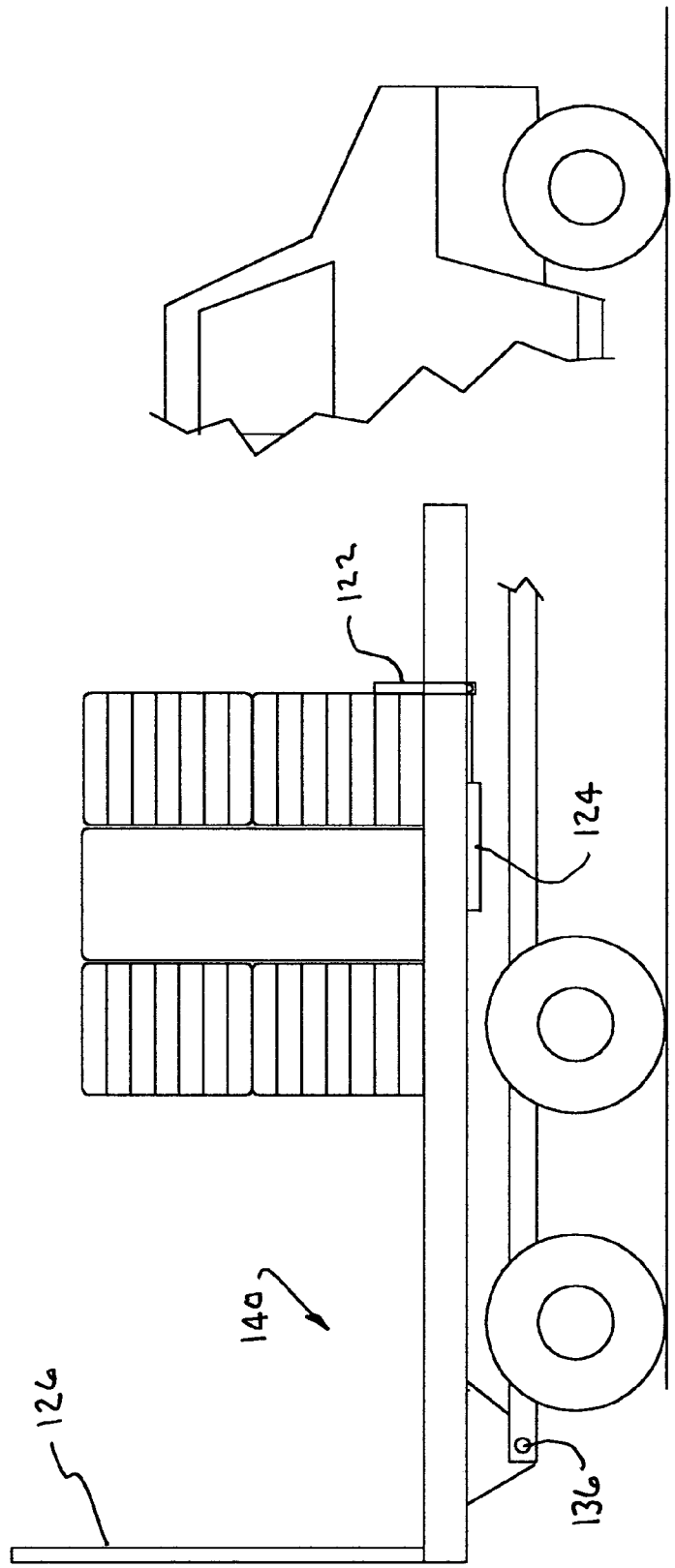
FIG. 12 is a side plan view of the bale wagon, showing alternate tiers of bales, horizontal-vertical-horizontal, being pushed rearwardly by the push bar.

Another component required for stack building is a push bar 122 to push each succeeding tier rearwardly on the load rack 140 until the load is complete (FIG. 12). Push bar 122 extends transversely to the line of travel of the unit, and is moved through the extension and retraction of hydraulic cylinder 124. The push bar need not extend much beyond the level of the load rack and, in fact, is low enough in its forward position to allow bales maneuvered by the bale manipulator mechanism 80 to be positioned rearwardly of the push bar without interference therebetween. In the alternative, push bar 122 may be easily made to pivot downwardly when moved in the forward direction (away from bales on the load rack 140).

A plurality of tines 126 is affixed to the rear of load rack 140 to hold the load while tipping to place the completed stack on the ground and a push-off bar 128. Load rack 140 is pivoted about pivot point 136 by hydraulic cylinder 138 between loading and unloading positions. Push-off bar 128 is powered by hydraulic cylinder 130 that pivots arm 132 about pivot point 134 to push the bale stack rearwardly, as the unit is driven forwardly, off of tines 126 onto the ground.

Figure 14:
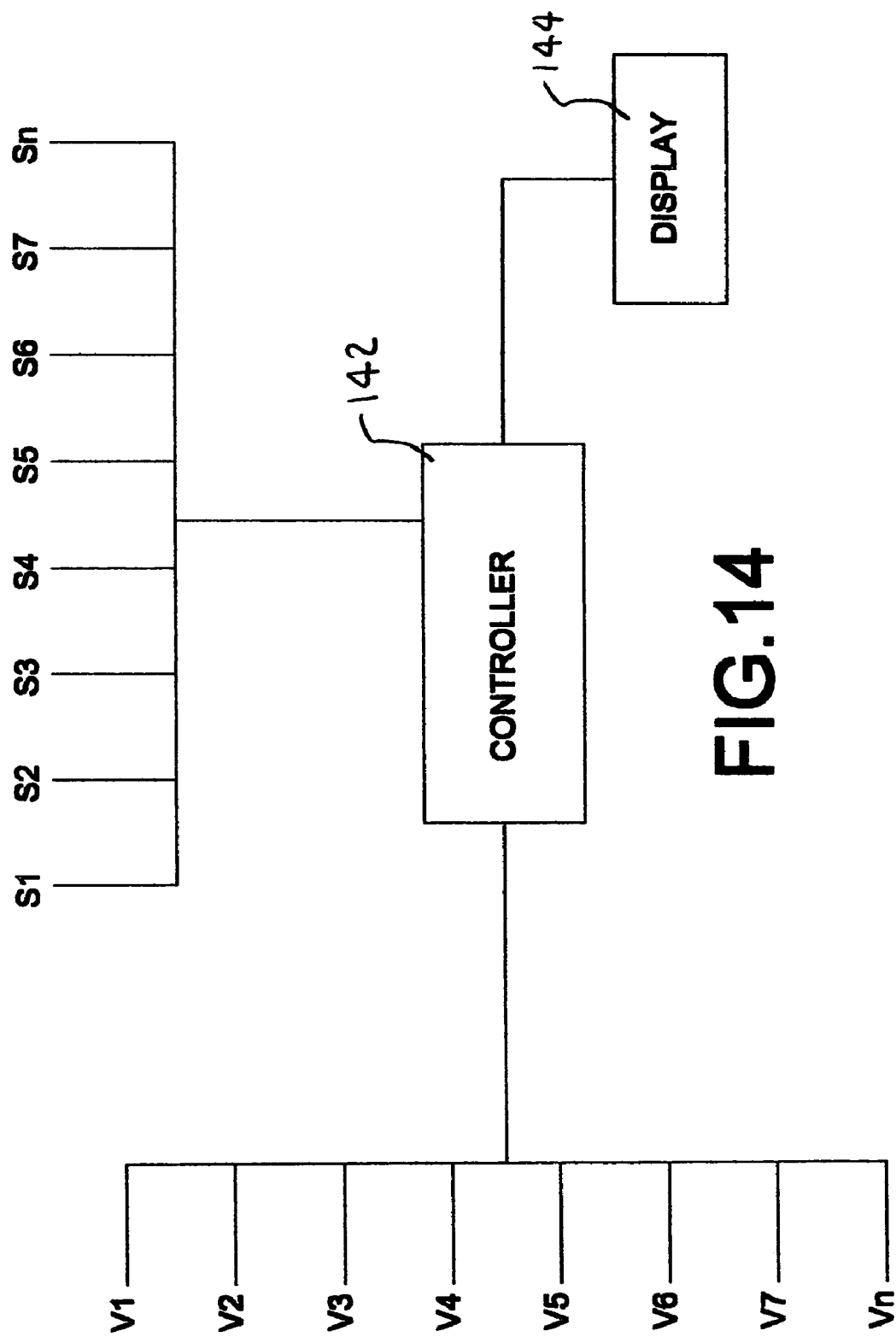
FIG. 14 is a schematic of a control system to manage the creation of bale stacks.

Automation is accomplished by using a controller 142 (FIG. 14) integrated with position feedback sensors S1 through Sn and electrically controlled hydraulic valves V1 through Vn. The controller synchronizes movements and positions of the bale loading mechanism 40, the bale manipulator mechanism 80, the mast 111 and other components throughout the loading and stack building process. The sensors are preferably electric, but can be any type that can meet reliability and endurance requirements. A visual display 144, with or without a touch screen, makes the setup and operation reasonably simple for the operator. The controller also has preset programs for the different sized bales and for different tie ter patterns. It would be desirable for the controller to have a "teach and repeat" capability for unforeseen stack building requirements.

Figure 13:
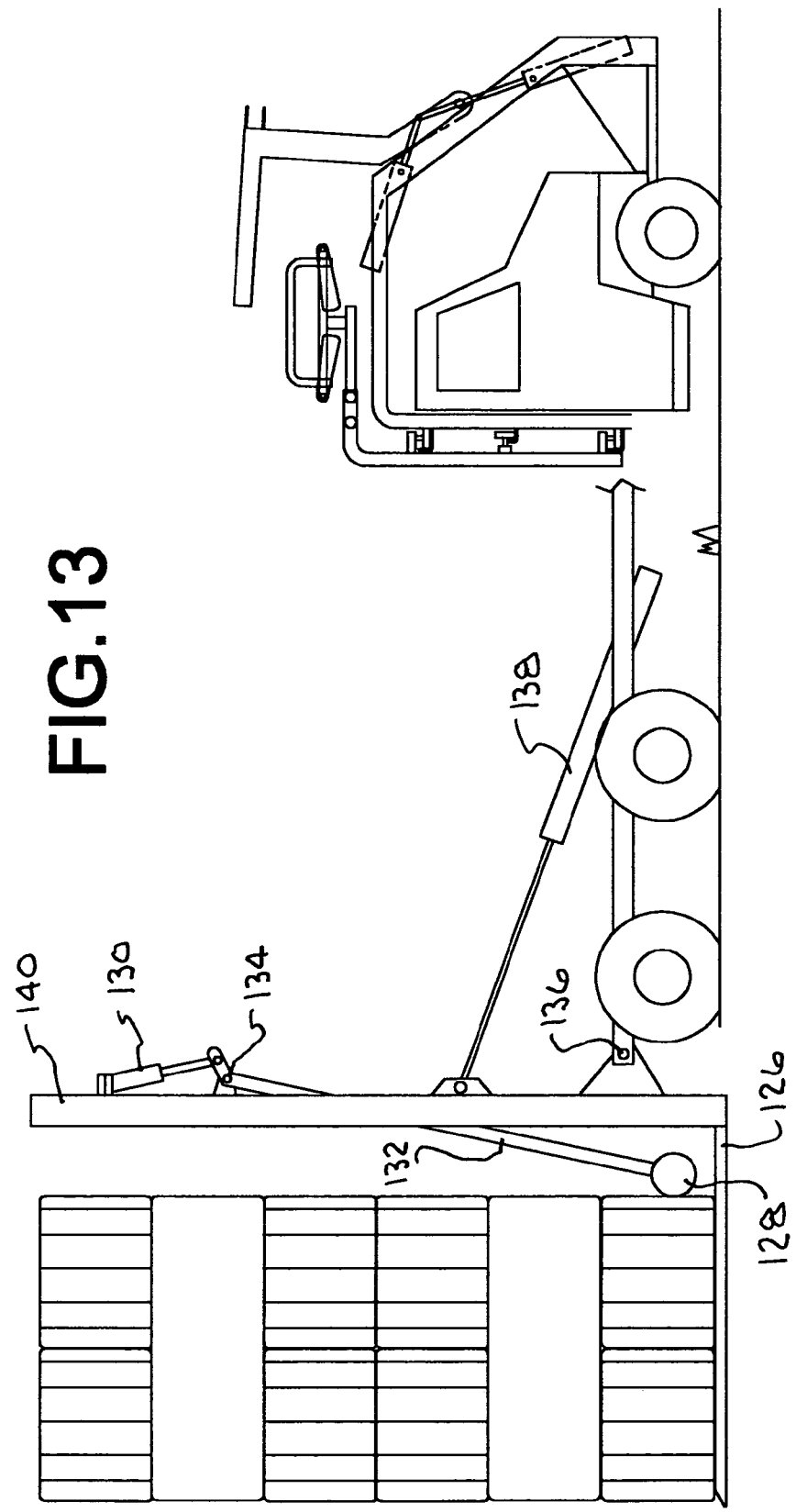
FIG. 13 is a side plan view of the bale wagon, showing a stack of bales being pushed rearwardly off the load tines by the push-off bar onto the ground.

In operation, the truck, with the bale handling components described above, approaches the bale to be loaded in the same direction as the baler traveled through the field (approaching the bale along its lengthwise axis). The truck is driven so that the bale is located centrally of the cab, in line with the bale loader, and the operator or a switch on the loader initiates the loading cycle. The bale loader 40 grasps the bale with clamp arms 42, 44 pivots upwardly and rearwardly, lifting the bale through approximately 180 degrees and deposits it on manipulation table 82 where it is clamped by bar clamp 86 and paddles 92, 94. The loader clamp then releases and returns to a clear position. Next, the bale is moved to the desired tier location through movements of manipulation table 82 along mast 111. When a tier is complete, it is pushed rearwardly with push bar 122. These steps are repeated until the load is complete. The completed stack is placed at the storage location by tilting the load rack approximately 90 degrees and then separating the stack from the load rack with push-off bar 128 (FIG. 13).

The main frame assembly and load rack assembly can be two preassembled modules for quick installation onto a truck chassis. The truck would only have to be set up to supply hydraulic and electrical power for the bale handling system. The main frame assembly would include hydraulic reservoir, valves, and associated plumbing; and electronic controller and associated wiring. This modular approach offers the opportunity for the manufacturer, a dealer or an end-use customer to provide the truck for the bale handler.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the inventions. Accordingly, the following claims are intended to protect the invention broadly as well as in the specific form shown.

Having thus described the invention, what is claimed is:

1. A vehicle for loading, hauling and stacking large rectangular bales comprising:
    an elongate fore-and-aft extending truck chassis having a first end, an opposing second end and a longitudinal plane extending therebetween;
    a truck cab supported by said chassis adjacent said first end thereof;
    an elongate load rack with a front end and an opposing rear end, said front end spaced from, said first end of said chassis and extending toward said second end of said chassis, said rear end of said load rack generally adjacent said second end of said chassis, said load rack further having a first bale-supporting surface and a pivot point on said chassis allowing said load rack to pivot upwardly and rearwardly:
    a bale manipulation mechanism supported by said chassis generally between said first end of said chassis and said front end of said load rack;
    said bale manipulation mechanism including:
        a carrier mast supported by said chassis and extending from a first position above said cab to a second lower position behind said cab;
        a carrier movably attached to said mast for selective movement along the length of said mast generally between said first and second positions;
        a bale manipulator table connected to said carrier, said table having a second bale-supporting surface and bale clamping mechanism adapted to selectively grasp a bale between actuated clamping components and hold the bale on said second bale-supporting surface;
        a rotation mechanism interconnecting said carrier and said bale manipulator table, said rotation mechanism capable of selectively rotating said bale manipulator table relative to said carrier generally 90 degrees; and
    a bale loader affixed to and supported by said first end of said chassis and extending at least partially forwardly thereof; said loader including:
        a bale grasping mechanism adapted to selectively grasp and hold a bale on the ground;
        a loader frame supported by said chassis adjacent said first end thereof, said loader frame having a first lower end and a remote higher end, said bale grasping mechanism affixed to said loader frame at said first lower end thereof, said loader frame further having a first section to which said bale grasping mechanism is attached and a second section pivotably connected to said first section such that said first section may be selectively pivoted between a pickup position where said bale grasping mechanism is located to grasp a bale on the ground in front of the cab and a second deposit position where a bale is deposited on said manipulator table;
    a plurality of hydraulic power components positioned to selectively rotate said manipulator table, said bale grasping mechanism, said bale clamping mechanism, the pivoting of said first section, and the movement of said carrier along said mast; and
    a plurality of tines affixed to said rear end of said load rack, whereby said bale grasping device may grasp and pick up a single bale from the ground, deposit it on said manipulator table, rotate the bale to the desired orientation, move the bale rearwardly and place it on said load rack, thereby building a stack of bales on said load rack.

2. The vehicle of claim 1, wherein:
said carrier is moved along said mast by a chain and gear arrangement powered by a hydraulic motor; and
said remaining plurality of hydraulic components are hydraulic cylinders.

3. The vehicle of claim 2, wherein:
said carrier mast includes components that allow said carrier to move horizontally, generally perpendicular to said longitudinal plane.

4. The vehicle of claim 3, further including:
a programmable controller supported on said chassis;
a plurality of position sensors located at appropriate locations in and adjacent said bale manipulation mechanism and in communication with said controller, whereby said controller activates said hydraulic cylinders sequentially or simultaneously to pick up bales, manipulate and deposit them on said load rack in the form of a stack.

5. The vehicle of claim 4, wherein:
said controller has a visual display connected thereto.

6. The vehicle of claim 1, further including:
a programmable controller supported on said chassis;
a plurality of position sensors located at appropriate locations in and adjacent said bale manipulation mechanism and in communication with said controller, whereby said controller activates said hydraulic cylinders sequentially or simultaneously to pick up bales, manipulate and deposit them on said load rack in the form of a stack.

7. The vehicle of claim 6, wherein:
said controller has a visual display connected thereto and located in said cab.

8. A vehicle for loading, hauling and stacking large rectangular bales comprising:
    an elongate fore-and-aft extending truck chassis having a first end, an opposing second end and a longitudinal axis extending therebetween;
    a truck cab supported by said chassis adjacent said first end thereof, said cab having a top and a generally vertical rear panel;
    an elongate load rack with a front end and an opposing rear end, said front end spaced from, said first end of said chassis and extending toward said second end of said chassis, said rear end of said load rack generally adjacent said second end of said chassis, said load rack further having a first bale-supporting surface and a pivot point on said chassis allowing said load rack to pivot upwardly and rearwardly;

a bale manipulation mechanism supported by said chassis generally between said first end of said chassis and said front end of said load rack;

said bale manipulation mechanism including:

a carrier mast supported on said cab and extending from a first position on said top of said cab partially across the top of and downward to a second lower position on said rear panel behind said cab;

a carrier movably attached to said mast for selective movement along the length of said mast generally between said first and second positions;

a bale manipulator table connected to said carrier having a second bale-supporting surface and bale clamping mechanism adapted to selectively grasp a bale between actuated clamping components and hold the bale on said second bale-supporting surface, said clamping mechanism capable of depositing a bale on said first surface or on another bale and releasing it without significantly displacing said bale or said another bale;

a rotation mechanism interconnecting said carrier and said bale manipulator table, said rotation mechanism capable of selectively rotating said bale manipulator table relative to said carrier generally 90 degrees; and a bale loader affixed to and supported by said first end of said chassis and extending at least partially forwardly thereof and capable of picking a bale up from the ground in front of the cab and depositing it on said bale manipulator table, whereby bales can be sequentially picked up from the ground and formed into a stack on said load rack.

9. The vehicle of claim 8, wherein:

said loader includes:

a bale grasping mechanism adapted to selectively grasp and hold a bale on the ground; and a loader frame supported by said chassis adjacent said first end thereof, said loader frame having a first lower end and a remote higher end, said bale grasping mechanism affixed to said loader frame at said first lower end thereof, said loader frame further having a first section to which said bale grasping mechanism is attached, and a second section pivotably connected to said first section such that said first section may be selectively pivoted between a pickup position where said bale grasping mechanism is located to grasp a bale on the ground in front of the cab and a second deposit position where a bale is deposited on said manipulator table.

10. The vehicle of claim 9, further including:

a plurality of hydraulic power components positioned to selectively rotate said manipulator table, operate said bale grasping mechanism and said bale clamping mechanism, the pivoting of said first section, and the movement of said carrier along said mast; and a plurality of tines affixed to said rear end of said load rack, whereby said bale grasping device may grasp and pick up a single bale from the ground, deposit it on said manipulator table, rotate the bale to the desired orientation, move the bale rearwardly and place it on said load rack, thereby building a stack of bales on said load rack.

11. The vehicle of claim 10, wherein:

said carrier is moved along said mast by a chain and gear arrangement powered by a hydraulic motor; and said remaining plurality of hydraulic components are hydraulic cylinders.

12. The vehicle of claim 11, wherein:

said carrier mast includes components that allow said carrier to move horizontally, generally perpendicular to said longitudinal plane.

13. The vehicle of claim 12, further including:

a programmable controller supported on said chassis;

a plurality of position sensors located at appropriate locations in and adjacent said bale manipulation mechanism and in communication with said controller, whereby said controller activates said hydraulic cylinders sequentially or simultaneously to pick up bales, manipulate and deposit them on said load rack in the form of a stack.

14. The vehicle of claim 13, wherein:

said controller has a visual display connected thereto.

15. The vehicle of claim 10, further including:

a programmable controller supported on said chassis;

a plurality of position sensors located at appropriate locations in and adjacent said bale manipulation mechanism and in communication with said controller, whereby said controller activates said hydraulic cylinders sequentially or simultaneously to pick up bales, manipulate and deposit them on said load rack in the form of a stack.

16. The vehicle of claim 15, wherein:

said controller has a visual display connected thereto and located in said cab.

17. A bale manipulation mechanism comprising:

a carrier mast adapted to be supported on and affixed to a cab of a truck chassis, the cab having a top panel and a vertical rear panel generally perpendicular to the top panel, said mast having a first end adapted on the top panel of the cab and a remote lower second end on the vertical rear panel;

a carrier movably attached to said mast for selective movement along the length of said mast generally between said first and second positions;

a bale manipulator table connected to said carrier, said table having a first bale-supporting surface and a bale clamping mechanism adapted to selectively grasp a bale between actuated clamping components and hold the bale on said first bale-supporting surface;

a rotation mechanism interconnecting said carrier and said bale manipulator table, said rotation mechanism capable of selectively rotating said bale manipulator table relative to said carrier generally 90 degrees; and a plurality of hydraulic components respectively connected to and providing operative power to said carrier, bale clamping mechanism, and rotation mechanism.

18. The bale manipulation mechanism of claim 17, wherein:

said carrier is moved along said mast by a chain and gear arrangement powered by a hydraulic motor; and said remaining plurality of hydraulic components are hydraulic cylinders.

19. The bale manipulation mechanism of claim 18, wherein:

said carrier mast includes components that allow said carrier to move horizontally, generally perpendicular to the direction of travel of the truck.

20. The bale manipulation mechanism of claim 19, further including;

a programmable controller adapted to be located in the cab;

a plurality of position sensors located at appropriate locations in and adjacent said bale manipulation mechanism and in communication with said controller, whereby said controller activates said hydraulic cylinders and said hydraulic motor sequentially or simultaneously to grasp bales, manipulate and release them.

* * * * *